(12) United States Patent
Holmgren

(10) Patent No.: US 8,083,027 B2
(45) Date of Patent: Dec. 27, 2011

(54) METHOD FOR MANUFACTURING A SANDWICH PANEL

(75) Inventor: Joakim Holmgren, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 12/693,650

(22) Filed: Jan. 26, 2010

(65) Prior Publication Data

US 2010/0187039 A1 Jul. 29, 2010

Related U.S. Application Data

(60) Provisional application No. 61/147,344, filed on Jan. 26, 2009.

(30) Foreign Application Priority Data

Jan. 26, 2009 (DE) .................... 10 2009 006 166

(51) Int. Cl.
- *E04B 1/82* (2006.01)
- *E04B 1/84* (2006.01)
- *G10K 11/168* (2006.01)
- *E04B 1/74* (2006.01)
- *G10K 11/16* (2006.01)

(52) U.S. Cl. .................... 181/290; 181/292; 181/296

(58) Field of Classification Search .................. 181/290, 181/292, 296, 288; 428/116; 493/966
See application file for complete search history.

(56) References Cited

U.S. PATENT DOCUMENTS

| | | | | |
|---|---|---|---|---|
| 2,448,966 A * | 9/1948 | Fales | .............................. | 73/147 |
| 3,249,659 A * | 5/1966 | Voelker | ......................... | 264/46.2 |
| 3,441,461 A * | 4/1969 | Vidal | .............................. | 156/285 |
| 4,347,912 A * | 9/1982 | Flocke et al. | ................. | 181/286 |
| 6,371,242 B1 * | 4/2002 | Wilson et al. | ................. | 181/292 |
| 6,443,257 B1 * | 9/2002 | Wiker et al. | .................. | 181/290 |
| 7,484,593 B2 * | 2/2009 | Braun et al. | ................... | 181/292 |
| 7,600,609 B2 * | 10/2009 | Nakamura | ..................... | 181/290 |
| 7,690,480 B2 * | 4/2010 | Mori et al. | ..................... | 181/290 |
| 7,789,197 B2 * | 9/2010 | Duval et al. | ................... | 181/290 |
| 7,883,763 B2 * | 2/2011 | Tinianov | ......................... | 428/201 |
| 2007/0137926 A1 * | 6/2007 | Albin et al. | ................... | 181/290 |
| 2010/0230206 A1 * | 9/2010 | Tinianov et al. | .............. | 181/286 |

FOREIGN PATENT DOCUMENTS

| DE | 1292546 B | 4/1969 |
|---|---|---|
| DE | 3720371 A1 | 1/1989 |
| DE | 4131394 A1 | 4/1993 |

(Continued)

*Primary Examiner* — Edgardo San Martin
(74) *Attorney, Agent, or Firm* — Ingrassia Fisher & Lorenz, P.C.

(57) ABSTRACT

A method for manufacturing a sandwich panel includes, but is not limited to the steps of providing at least one air-permeable core layer and at least one porous cover layer, applying an adhesive onto a first area of the core layer, pressing the cover layer onto the first area of the core layer to connect the cover layer to the core layer, and applying an airstream that from the outside is directed onto the cover layer and that moves through the cover layer and the core layer. By means of such an airstream it is possible to prevent excessive accumulation of adhesive on the cover layer, which otherwise would result in partial blocking of the cover layer. By varying the intensity of the airstream the flow resistance of the arrangement including, but not limited to, the cover layer and the core layer may be determined and set during the bonding process. In this way a sandwich panel with precise sound-absorption behavior can be manufactured.

9 Claims, 6 Drawing Sheets

FOREIGN PATENT DOCUMENTS

| | | | |
|---|---|---|---|
| DE | 69603991 T2 | 5/2000 |
| DE | 60210069 T2 | 11/2006 |
| DE | 102006023294 A1 | 11/2007 |
| EP | 0725117 A2 | 8/1996 |
| NL | 8105312 A | 6/1983 |
| WO | 2007135085 A1 | 11/2007 |

* cited by examiner

METHOD FOR MANUFACTURING A SANDWICH PANEL

CROSS-REFERENCE TO RELATED APPLICATIONS

This application claims the benefit of the filing date of German Patent Application No. 102009006166.5 filed Jan. 26, 2009 and of U.S. Provisional Patent Application No. 61/147,344 filed Jan. 26, 2009, the disclosure of which applications is hereby incorporated herein by reference.

TECHNICAL FIELD

The invention relates to a method for manufacturing a sound-absorbing sandwich panel, a system for manufacturing a sandwich panel, a sandwich panel, a sound absorber, and an aircraft.

BACKGROUND

In order to provide sound insulation in vehicles, frequently sound-absorbing sandwich panels are used that essentially comprise at least one core layer and at least one or several cover layers to cover the core layer. In this arrangement at least one of the cover layers is air-permeable and comprises a certain flow resistance. In order to reflect noise a further cover layer can also be designed so as to be air-impermeable. With a corresponding design of the core layer and of the cover layers, which, for example, comprises specifying air-permeability or porosity, air change flows from the outside into the core layer, and from the core layer to the outside, can be achieved. Among other things the sound-absorbing effect occurs in that during flowing through the porous material of a cover layer, part of the sound energy is converted to heat. In order to achieve a precisely defined sound absorbing effect, and in particular matching the expected frequency spectrum of the noise source, matching the flow resistance of at least one cover layer and of the core material is necessary. For example, DE 37 20 371 A1, DE 10 2006 023 294 A1 and WO 2007/135085 A1 show sandwich panels, each comprising at least one core layer and at least one porous or perforated cover layer.

In the state of the art it is common to manufacture such sound-absorbing sandwich panels in such a way that a core layer is provided, to which adhesive is then applied, wherein subsequently at least one cover layer is pressed onto the area of the core layer, which area comprises adhesive. After the adhesive has cured, the cover layer and the core layer are firmly interconnected to form a sandwich panel. However, there is a problem when bonding the cover layer in that, when the cover layer is pressed on, adhesive collects even in those locations of the cover layer, which locations are not directly connected to the core layer. For example, the core layer could comprise a honeycomb structure, wherein the individual honeycombs are separated from each other by honeycomb walls (hereinafter also referred to as "webs"). Ideally the cover layer is connected to adhesive only directly over the webs, however, it should be noted that from these webs the adhesive spreads to adjacent regions of the cover layer, thus at least partly blocking the cover layer that is porous or perforated. This makes it more difficult to match the fluidic characteristics of the manufactured sandwich panel to the expected frequency spectrum of the sound source. In a sandwich panel manufactured in this way it is impossible to precisely predict the percentage of the cover layer that is blocked by adhesive, and the flow resistance which the cover layer thus comprises.

SUMMARY

It may be considered an object of the invention to propose a method for manufacturing a sound-absorbing sandwich panel, in which method defined sound-absorbing characteristics of the sandwich panel can be precisely achieved. Furthermore, it is to be considered an object of the invention to propose a system that can repeatably achieve the manufacture of a sound-absorbing sandwich panel with precise sound-absorbing characteristics. Furthermore, it is an object of the invention to propose a sound-absorbing sandwich panel with precisely defined sound-absorbing characteristics.

According to a first aspect of the present invention, a method for manufacturing a sandwich panel is proposed, in which method an adhesive may be applied to a first area of a provided core layer that at least in some regions is air-permeable, subsequently a cover layer that at least in some regions is air-permeable may be pressed onto the first area of the core layer, and subsequently an airstream that from the outside may be directed onto the cover layer and that moves through the cover layer and the core layer may be applied.

By means of an airstream that is aligned in this manner it may be possible to prevent excessive adhesive accumulation on the cover layer, which otherwise would result in partial blocking of the cover layer. As a result of the airstream the adhesive that is situated between the core layer and the cover layer may move into the core layer in a direction that faces away from the cover layer.

At this point it is assumed, for example, that the core layer is formed from a honeycomb material and comprises adhesive on webs to delimit the honeycomb. The cover layer to be bonded to the core layer would thus have to be connected to the webs. Since such webs are normally relatively narrow, the respective contact area onto which adhesive has been applied is relatively small so that there is adhesive also on the lateral areas of the webs, and as a result of adhesion forces or capillary forces easily flows out laterally into the porous cover layer. As a result of the inventive application of the airstream, this lateral outflow of adhesive into the cover layer may be reduced so that the area of the cover layer, which area is impinged upon by adhesive, is reduced. The airstream acts on the adhesive in such a manner that at least in part the adhesion forces or capillary forces are balanced, and the adhesive spreads more in the direction of the core layer so that consequently the percentage of the cover layer that is blocked by adhesive is reduced when compared to the percentage in the state of the art.

In order to attain high precision of the fluidic characteristics to be achieved and thus of the sound-absorbing characteristics, in the present airstream according to the invention the pressure drop of the airstream above the sandwich panel may be measured at any time. In this way the actual flow resistance of the sandwich panel may be determined at any time. Consequently already prior to curing of the adhesive it may be precisely determined whether the sandwich panel to be manufactured will achieve the predetermined flow characteristics that are required for effective sound insulation. If this is not the case, remedial action on the sandwich panel to be manufactured may be carried out while the adhesive has not yet cured. This could be implemented in that the intensity of the airstream is varied. For example, if the flow resistance determined at the time is too high, by means of intensifying the airstream applied, the still fluid adhesive could be conveyed further away from the cover layer so that the percentage of the area of the cover layer that is covered by adhesive is reduced and consequently there is a corresponding reduction in the air resistance. As an alternative, or in addition, to varying the airstream, it is also possible to increase the temperature of the airstream in order to reduce the viscosity of the adhesive and thus to encourage the adhesive to flow away from the cover layer.

With the application of the method according to the invention it thus becomes possible to provide a sandwich panel for sound insulation, wherein already during the method for manufacturing the sandwich panel the predefined fluidic characteristics may be determined precisely and may be set by means of various measures. By means of an airstream impinging on the cover layer, furthermore, the cover layer is pressed onto the core layer so that in an ideal case no further provisions need to be made in this respect.

At this point it should be noted that the application of the method according to the invention is not to be limited to one or to a small number of types of core layers, but instead may be used for any type of porous cover layer. The main requirement consists of the core layer comprising a certain air permeability by means of which the core layer is in the very position to make a contribution with known sound absorption based on airstream mechanisms. It is not necessary for the core layer to comprise mechanical characteristics that impart to the sandwich panel suitability to build objects that take up structural or mechanical loads. The core layer essentially serves to act as a spacer between a porous cover layer and a further porous or air-impermeable cover layer and to prevent the propagation of sound along the sandwich panel. The porous cover layer may continue to be implemented in a multitude of ways, be it by means of porous metal mesh, knitted metal fiber, perforated foils or the like.

The applications of a sandwich panel manufactured by means of the method according to the invention are manifold, wherein in the present description, for the purpose of simplification, reference is made in an exemplary manner to the application in air inlets, air outlets, air distributors and the like. Without specifically stating this each time, in the case of (air) inlets or outlets reference may be made both to the opening for taking up or delivering a flowing medium, and to the duct that follows from the opening and that guides the flowing medium. Without limiting the scope of protection, furthermore, reference is made to the advantageous application of sandwich panels, manufactured in the manner according to the invention, for sound absorption in vehicles and in particular in aircraft, where said sandwich panels may be used to line cabins, engine nacelles or to create sound-absorbing air inlets for any systems or outlets, for example as an exhaust gas outlet for an auxiliary power unit (APU).

In an advantageous improvement of the method according to the invention, as already explained above, the pressure drop over the core layer and the cover layer at the airstream that is input is determined. This could be achieved by means of a differential pressure sensor that when viewed from the sandwich panel comprises at least one pressure measuring aperture upstream, and at least one pressure measuring aperture downstream. On the other hand it is also possible to use several absolute pressure sensors whose determined pressure values then need to be subtracted one from the other.

It is, furthermore, particularly favorable to compare the flow resistance determined at a given time with a predetermined flow resistance in order to determine any difference. Consequently, timely adjustment of the distribution of the adhesive between the cover layer and the core layer is possible in order to achieve the predetermined fluidic characteristics.

In a further advantageous embodiment of the method according to the invention, the intensity of the airstream is varied depending on the determined deviation from the specified flow resistance. This means in particular that the intensity of the airstream is increased if the determined flow resistance is too high.

In order to influence the viscosity of the adhesive, a likewise advantageous improvement of the method according to the invention provides for an increase in the temperature of the airstream so that if a deviation from the specified flow resistance is determined, excessive adhesive may be removed from the cover layer.

In a preferred improvement of the method according to the invention the sandwich panel is manufactured in a closed flow duct. This provides a particular advantage in that the direction of the airstream may be aligned precisely to the sandwich panel to be manufactured, and by means of the integration of a flow machine, for example a fan, the method according to the invention may, furthermore, be implemented in a favorable manner from the point of view of energy consumption.

The object of the invention is, furthermore, met by a system for manufacturing a sandwich panel.

The system according to the invention could, for example, comprise a means for holding a core layer and a cover layer that has been pressed onto the core layer by means of an adhesive. The system according to the invention could furthermore comprise a flow machine for applying an airstream onto the core layer and the cover layer so that with the above-mentioned measures curing of the adhesive may take place while at the same time the desired fluidic characteristics are obtained.

In a preferred improvement of the system according to the invention the means for holding and the flow machine are in a closed-off flow duct so that the airstream may be directed and by means of the closed circulatory system the corresponding airstream may be applied in a favorable manner from the point of view of energy consumption.

In a further particularly preferred improvement of the system according to the invention a device for determining a pressure difference is located at the sandwich panel so that the flow resistance of said sandwich panel may be determined at any time. This could preferably be carried out by a differential pressure sensor that is singly or multiply integrated in the closed flow duct. On the other hand it would also be imaginable to arrange several absolute pressure sensors in the airstream duct in order to be able to ascertain a corresponding pressure difference from the determined absolute pressure values.

Furthermore, the system according to the invention could comprise an electronics unit that compares with a predetermined value the pressure drop over the sandwich panel to be manufactured. As an alternative to this, from the determined pressure drop, the electronics unit could determine the flow resistance of the sandwich panel to be manufactured and could compare it with a predetermined flow resistance. Depending on a determined difference, the intensity of the airstream may be varied.

Finally, the system according to the invention could comprise a heating apparatus that makes it possible to increase the temperature of the airstream. The heating apparatus could, for example, be connected to the electronics unit so that it is activated when a defined flow resistance is exceeded. Furthermore, this object is met by a sandwich panel. Finally, the object of the invention is also met by a sound absorber and an aircraft comprising at least one sound-absorbing sandwich panel according to the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
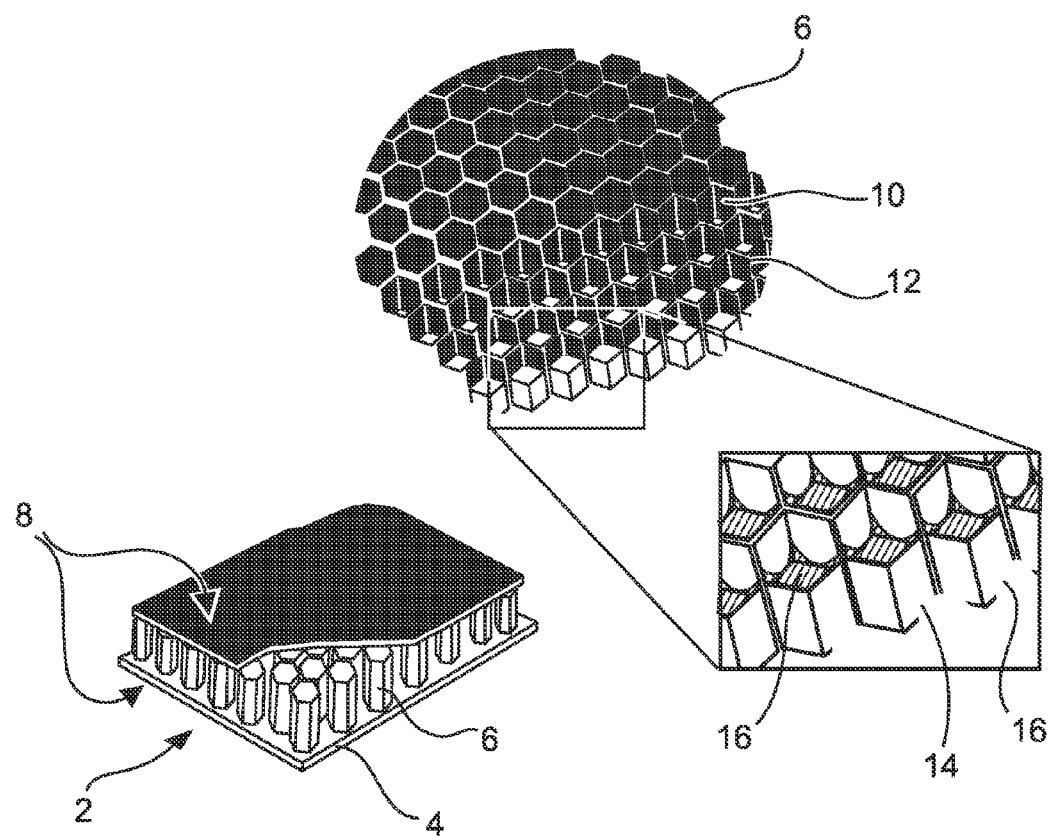
FIG. 1 shows an overview of an exemplary sandwich panel.

The overview of FIG. 1 as an example shows a sandwich panel 2 that is constructed from a rigid end plate 4, from a honeycomb core layer 6 and from a porous cover layer 8. As an example, the core layer 6 is designed as a honeycomb core layer in which individual honeycombs 10 extend between the porous cover layer 8 and the cover plate 4 and are separated from each other by webs 12. An adhesive 14 is used to connect the core layer 6 to the cover layer 8, which adhesive 14 connects to the webs 12 and the cover layer 8.

As shown in the illustration, while the adhesive 14 covers at least part of the webs 12 it nonetheless leaves free an opening 16 in each honeycomb 10 so that air may flow through the corresponding honeycomb 10. Airborne sound that enters through the porous cover layer 8 may correspondingly travel in the direction of the end plate 4, is reflected by said end plate 4, and at least to a large extent exits through the porous cover layer 8. In order to achieve a precisely defined sound-absorption behavior it is necessary to precisely achieve a defined flow resistance, which at least in the state of the art is difficult to achieve because of the openings 16 lined by adhesive 14.

Figure 2:
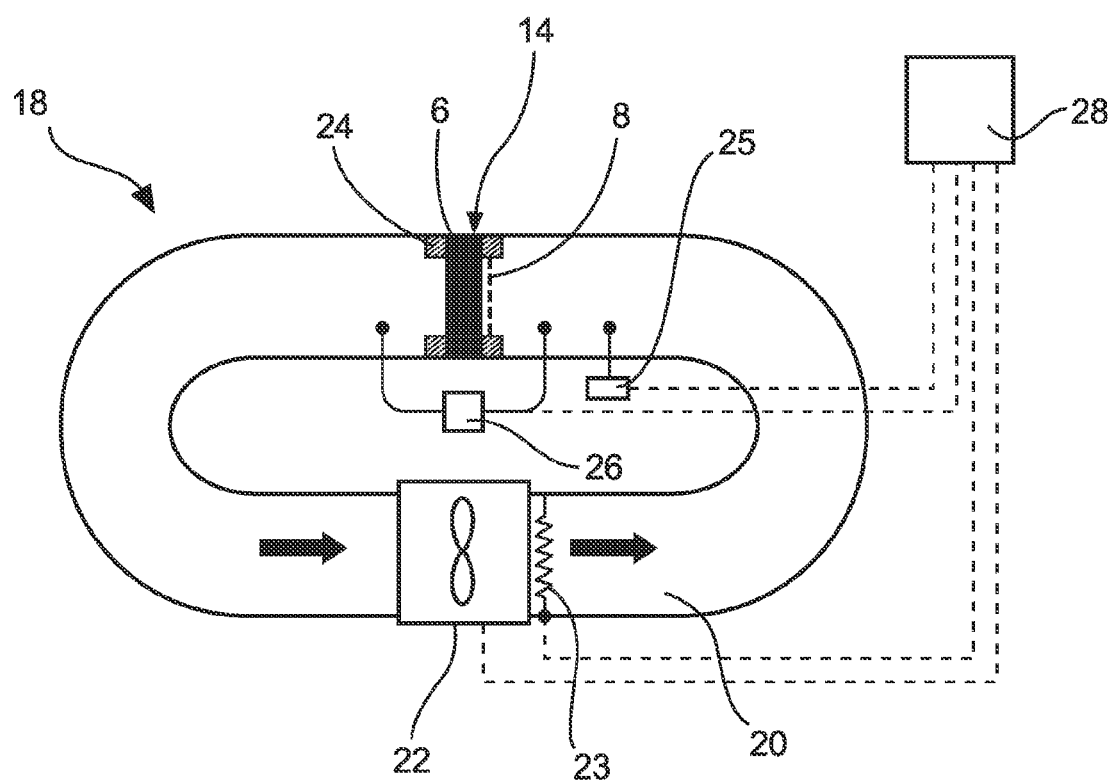
FIG. 2 shows a system according to an embodiment of the invention for implementing the method according to an embodiment of the invention.

FIG. 2 shows a system 18 according to an embodiment of the invention, which as an example comprises a closed flow duct 20 in which a flow machine 22 is arranged. This flow machine 22 could, for example, be a blower, a ventilator or the like, and is equipped to generate an airstream within the flow duct 20.

Furthermore, the core layer 6 and the cover layer 8 are held in the flow duct 20 in a retention element 24 that is suitable for this. The core layer 6 comprises adhesive 14; the cover layer 8 has been pressed onto the core layer 6 and onto the adhesive 14 located on said core layer 6. By generating an airstream by means of the flow machine 22, which airstream is directed onto the cover layer 8, the adhesive 14 is made to move from the cover layer 8 in the direction of the interior of the core layer 6. In this way the percentage of the surface of the cover layer 8 which is impinged on by adhesive 14 is reduced as long as the adhesive 14 is still able to flow and has not cured yet. In this arrangement the air-permeability of the cover layer 8 may be increased by increasing the air-permeable percentage of the area.

Impingement of the two layers 6 and 8 to be bonded to each other provides a further advantage in that the cover layer 8 is pressed onto the adhesive 14 that is present on the core layer 6.

It is particularly advantageous to integrate a sensor 26 that is equipped to measure the pressure differential above the sandwich panel 2 while the airstream is applied. The sensor 26 could, for example, be designed as a differential pressure sensor that determines the pressure differential between both sides of the sandwich panel 2. By means of knowledge of the pressure differential and knowledge of the flow parameters of the airstream applied, for example the volume flow and the area of the flow duct 20 through which the airstream moves, the flow resistance of the sandwich panel 2 may be determined.

In this context it is imaginable to integrate an electronics unit 28, such as a control device, arithmetic device, computer or the like, into the system 18 which electronics unit 28 may not only determine the flow resistance of the sandwich panel 2 at any given time, but may also control the air throughput through the flow machine 22 in cases where the flow resistance of the sandwich panel 2 differs from a predetermined flow resistance. To this effect the electronics unit 28 is coupled to the sensor 26 by way of corresponding data lines or signal lines and could furthermore comprise means that are suitable for controlling the flow machine 22. For example, this could be a power electronics device that may correspondingly control an electrically driven condenser.

In addition, a heating apparatus 23 is integrated in the flow duct 20, which heating apparatus 23 is equipped to increase the temperature of the airstream generated by the flow machine 22. Preferably the heating device is connected to the electronics unit 28 so that if a difference from a predetermined pressure drop or from a predetermined flow resistance is detected, the viscosity of the adhesive may be influenced correspondingly.

In order to determine the temperature of the airstream, furthermore a temperature sensor 25 is integrated in the flow duct 20, by means of which the temperature of the airstream could be varied, for example by way of predefined characteristics, depending on the difference from a flow resistance to be set.

Figure 3A:
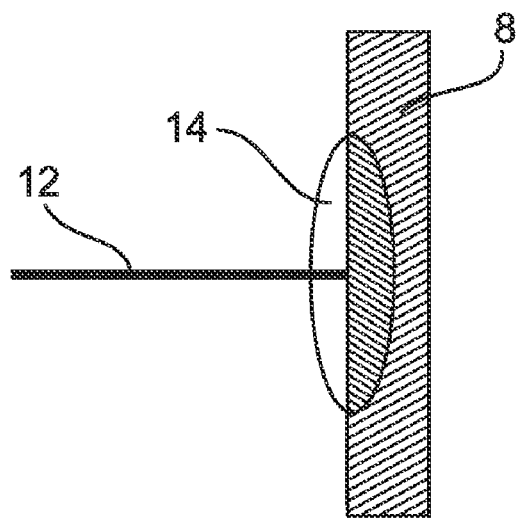
FIGS. 3a and 3b diagrammatically show the distribution of the adhesive in the state of the art, and with the application of the method according to an embodiment of the invention.
Figure 3B:
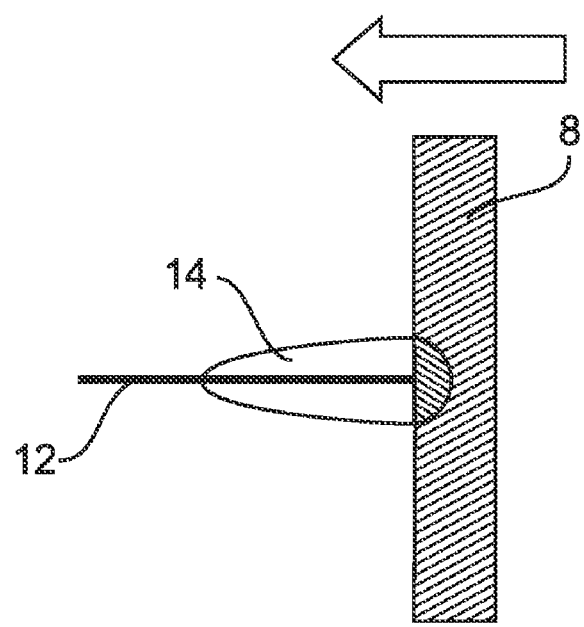

The system 18 according to an embodiment of the invention makes it possible to manufacture a sandwich panel 2 with precisely predetermined fluidic characteristics, which is illustrated in the context of the following FIGS. 3a and 3b.

FIG. 3a shows a section of a cover layer 8, which rests on a web 12 of the core layer 6, which web 12 has, for example, been moved out. Between the cover layer 8 and the web 12 there is adhesive 14 that has spread on the cover layer 8 and that has penetrated the porous cover layer 8, wherein the web 12 is immersed in the adhesive 14. The illustration shows that a relatively large area around the web 12 on the cover layer 8 comprises adhesive that at least restricts the air-permeability of the cover layer 8 and makes it impossible to precisely predict said air-permeability.

When the airstream starts to flow through the system 18 according to an embodiment of the invention, or when the method according to an embodiment of the invention is applied, the adhesive 14 moves away from the cover layer 8 and, while assuming a fluidically favorable form, spreads further on the web 12. The area of the cover layer 8 taken up is correspondingly significantly smaller than it is without the effect of the airstream, as shown in FIG. 3a. Correspondingly it is possible, by way of the airstream, to maintain the air-permeability of the cover layer 8. With a corresponding composition of the adhesive the viscosity may be reduced by applying heat through the heating apparatus 23, and as a result of this, the adjustment the flow resistance is further simplified.

Figure 4A:
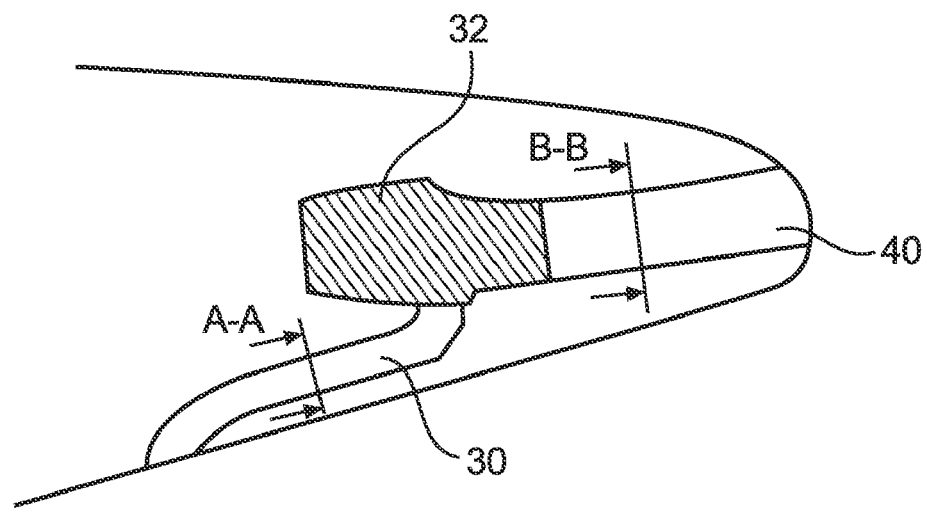
FIGS. 4a to 4c diagrammatically show the application of a sandwich panel according to an embodiment of the invention for the sound-insulation of pipes of an auxiliary power unit in an aircraft.
Figure 4B:
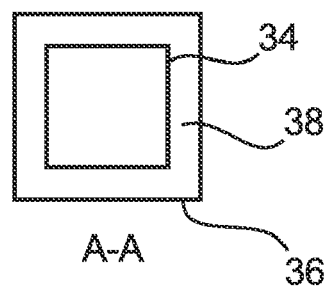
Figure 4C:
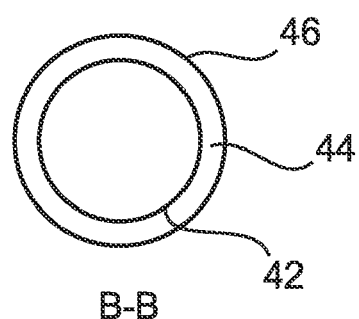

FIGS. 4a to 4c illustrate one of many possible applications, namely the option of manufacturing a duct-like sound absorber for sound absorption by means of the sandwich panel 2 manufactured with the use of the method according to the invention. As an example, the diagrams first show a sound-absorbing air inlet 30 which may, for example, be used to supply air to an auxiliary power unit 32 of an aircraft. As shown in FIG. 4c, the cross section of such an air inlet 30 could be rectangular in design, wherein the insides 34 of the air inlet 30 are designed as a porous cover layer, the outsides 36 are designed as rigid end plates that reflect sound, and the space 38 situated in between is designed as a core layer which for the purpose of preventing sound propagation comprises honeycomb structures within the sandwich panels.

With a selection of suitable materials for the individual layers the sandwich panel 2 according to an embodiment of the invention could also be used as a sound-absorbing exhaust gas outlet 40, for example for the auxiliary power unit 32. Merely as an example, FIG. 4c shows the possible circular cross section of such an exhaust gas outlet 40. The inside 42 is, for example, implemented as a porous cover layer that has been bonded onto a core layer 44 which in turn is closed off by outer end plates 46.

It is understood that any type of sandwich panel with a porous or otherwise air-permeable core layer and at least one porous cover layer may be produced by means of the method according to the invention and may be used for a host of different sound-absorbing products that are not limited to absorbing the sound of objects through which air flows, nor to sound insulation within spaces, nor to the application in vehicles or in particular in aircraft.

Figure 5:
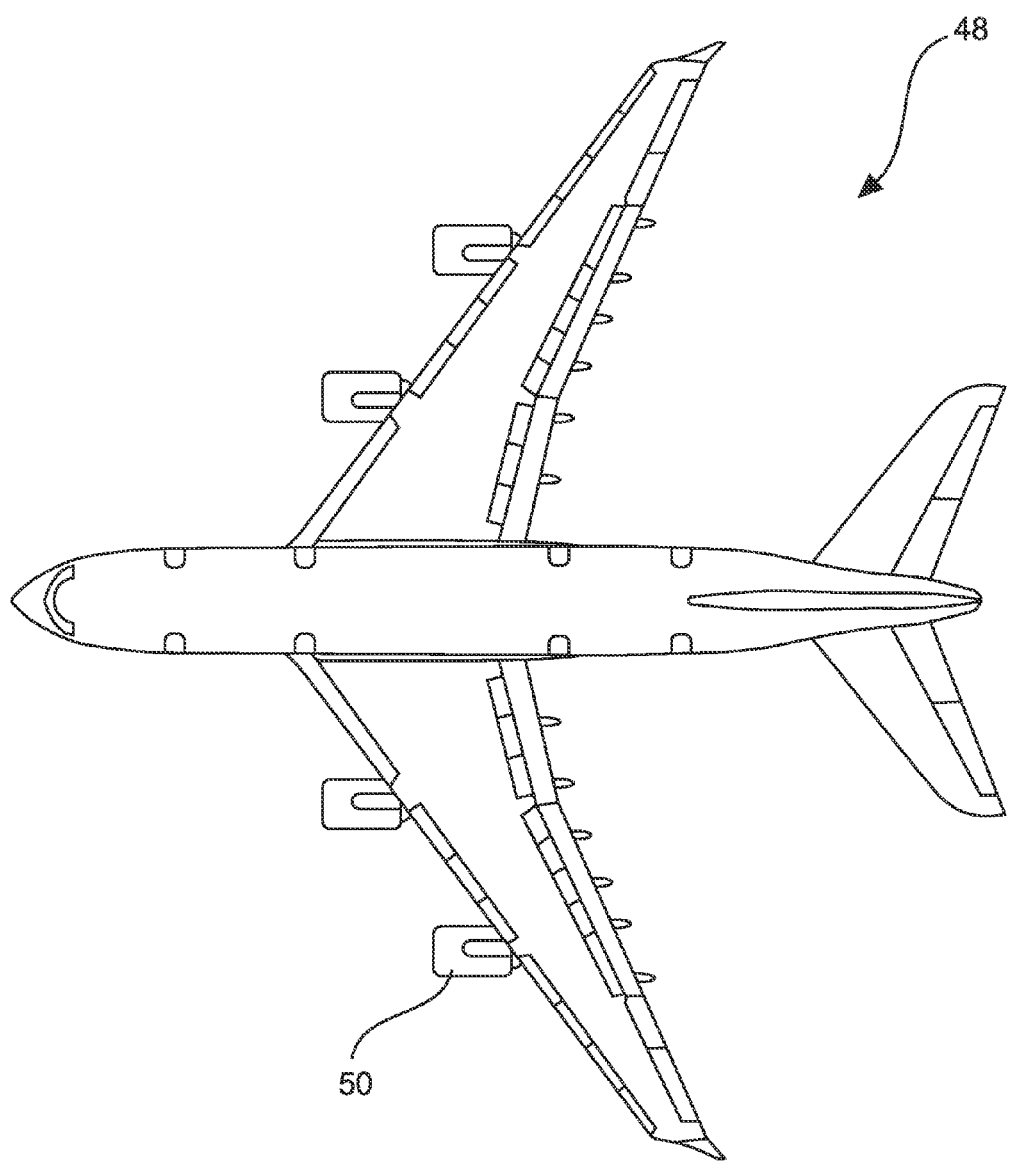
FIG. 5 shows an aircraft with at least one sandwich panel according to an embodiment of the invention.

FIG. 5 shows an aircraft 48 that comprises at least one sandwich panel 2 according to an embodiment of the invention, for example for sound absorption in the context of an air inlet 30 of an auxiliary power unit; for sound absorption in the context of an exhaust gas outlet 40 of an auxiliary power unit; as an inner or outer engine nacelle 50; for the interior lining of a cabin and the like. With a corresponding mechanical design, air inlets, air outlets or exhaust gas outlets may either be formed by sandwich panels manufactured according to an embodiment of the invention, or may be lined by said sandwich panels.

Figure 6:
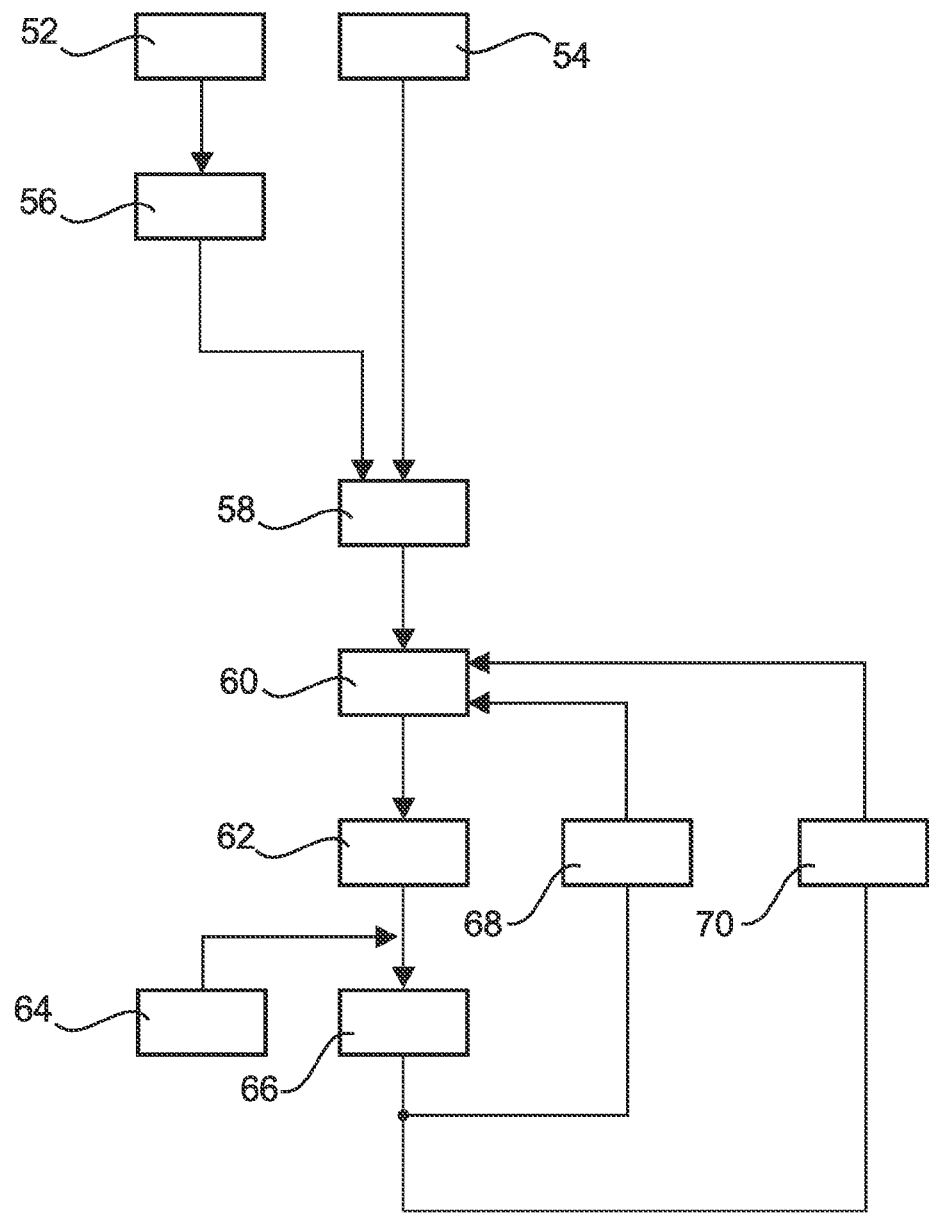
FIG. 6 shows a synopsis of the method according to an embodiment of the invention.

Finally, FIG. 6 provides a synoptic diagrammatic view of the method according to an embodiment of the invention. After the provision 52 of an at least in part air-permeable core layer 6, the provision 54 of an at least in part porous cover layer 8 and the application 56 of adhesive 14 onto a first area of the core layer 6, the porous cover layer 8 is pressed 58 onto the adhesive 14 of the core layer 6. Subsequently the arrangement comprising a cover layer 8 and a core layer 6 is impinged on 60 by an airstream. After measuring 62 state quantities of the airstream, i.e. the pressure drop and/or the temperature, or optionally subsequent determination 64 of the flow resistance at the time, a difference of the pressure drop or of the flow resistance may be formed 66, which leads to a variation 68 in the intensity of the airstream and/or to a variation 70 in the temperature by means of a change in the heat output of the heating apparatus 23.

After the above-mentioned method-related steps have been carried out it is of course possible to arrange a further porous cover layer 8 on the other face of the core layer, in that the method-related steps for this further cover layer 8 are carried out anew. As an alternative to this, after a cover layer 8 has been applied, it is also possible to bond a rigid end plate 4, wherein in the case of a non-air-permeable end plate 4 it is not necessary to carry out the method-related steps according to the invention.

In addition, it should be pointed out that "comprising" does not exclude other elements, and that "a" or "one" does not exclude a plural number. Reference characters in the claims are not to be interpreted as limitations.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for manufacturing a sandwich panel, comprising the steps of:
    providing at least one core layer that at least in some regions is air-permeable;
    providing at least one cover layer that at least in some regions is porous;
    applying an adhesive onto a first area of the at least one core layer;
    pressing the at least one cover layer onto the first area of the at least one core layer to connect the at least one cover layer to the at least one core layer;
    applying an airstream that from the outside is directed onto the at least one cover layer and that moves through the at least one cover layer and the at least one core layer
    determining a pressure drop across the at least one core layer and the at least one cover layer; and
    varying an intensity of the airstream based at least in part on the pressure drop from a predetermined pressure drop during the bonding process of the sandwich panel.

2. The method of claim 1, further comprising the step of determining a flow resistance of the arrangement comprising the at least one core layer and the at least one cover layer from the pressure drop.

3. The method of claim 1, further comprising the step of varying an intensity of the airstream depending on a difference of an actual flow resistance from a predetermined flow resistance.

4. The method of claim 1, further comprising the step of varying a temperature of the airstream by means of a heating apparatus depending on a difference of the pressure drop from a predetermined pressure drop.

5. The method of claim 1, further comprising the step of varying a temperature of the airstream by means of a heating apparatus depending on a difference of an actual flow resistance from a predetermined flow resistance.

6. The method of claim 1, wherein a temperature of the airstream is determined by means of a temperature sensor.

7. A sandwich panel, comprising:
    at least one core layer that at least in some regions is air-impermeable; and at least one cover layer that at least in some regions is porous,
wherein the sandwich panel has been manufactured according to the steps of:
providing at least one core layer that at least in some regions is air-permeable;
providing at least one cover layer that at least in some regions is porous;
applying an adhesive onto a first area of the at least one core layer;
pressing the at least one cover layer onto the first area of the at least one core layer to connect the at least one cover layer to the at least one core layer;
applying an airstream that from the outside is directed onto the at least one cover layer and that moves through the at least one cover layer and the at least one core layer;
determining a pressure drop across the at least one core layer and the at least one cover layer; and
varying an intensity of the airstream based at least in part on the pressure drop from a predetermined pressure drop during the bonding process of the sandwich panel.

8. A sound absorber for a sound-absorbing guiding of flowing gases, comprising:
at least one core layer that at least in some regions is air-impermeable; and
at least one cover layer that at least in some regions is porous,
wherein a sandwich panel has been manufactured according to the steps of:
providing at least one core layer that at least in some regions is air-permeable;
providing at least one cover layer that at least in some regions is porous;
applying an adhesive onto a first area of the at least one core layer;
pressing the at least one cover layer onto the first area of the at least one core layer to connect the at least one cover layer to the at least one core layer;
applying an airstream that from the outside is directed onto the at least one cover layer and that moves through the at least one cover layer and the at least one core layer;
determining a pressure drop across the at least one core layer and the at least one cover layer; and
varying an intensity of the airstream based at least in part on the pressure drop from a predetermined pressure drop during the bonding process of the sandwich panel.

9. An aircraft comprising:
at least one core layer that at least in some regions is air-impermeable; and
at least one cover layer that at least in some regions is porous,
wherein a sandwich panel has been manufactured according to the steps of:
providing at least one core layer that at least in some regions is air-permeable;
providing at least one cover layer that at least in some regions is porous;
applying an adhesive onto a first area of the at least one core layer;
pressing the at least one cover layer onto the first area of the at least one core layer to connect the at least one cover layer to the at least one core layer;
applying an airstream that from the outside is directed onto the at least one cover layer and that moves through the at least one cover layer and the at least one core layer;
determining a pressure drop across the at least one core layer and the at least one cover layer; and
varying an intensity of the airstream based at least in part on the pressure drop from a predetermined pressure drop during the bonding process of the sandwich panel.

\* \* \* \* \*